United States Patent
Ogura

(10) Patent No.: US 6,909,253 B2
(45) Date of Patent: Jun. 21, 2005

(54) ROTATION SPEED CONTROL APPARATUS OF OPEN CLOSE BODY FOR VEHICLE AND ROTATION SPEED CONTROL METHOD OF THE SAME

(75) Inventor: Hibiki Ogura, Machida (JP)

(73) Assignee: Ohi Seisakusho Co., Ltd., Kanagawa (JP)

( * ) Notice: Subject to any disclaimer, the term of this patent is extended or adjusted under 35 U.S.C. 154(b) by 0 days.

(21) Appl. No.: 10/684,080

(22) Filed: Oct. 9, 2003

(65) Prior Publication Data
US 2004/0070355 A1 Apr. 15, 2004

(30) Foreign Application Priority Data
Oct. 9, 2002 (JP) .................................... P2002-295782

(51) Int. Cl.⁷ ............................................... E05F 15/12
(52) U.S. Cl. ...................... 318/430; 318/272; 318/286; 318/468
(58) Field of Search ................................ 318/268, 272, 318/286, 430–434, 466–470

(56) References Cited

U.S. PATENT DOCUMENTS

| | | | | | |
|---|---|---|---|---|---|
| 5,747,956 | A | * | 5/1998 | Lamm | 318/599 |
| 5,770,934 | A | * | 6/1998 | Theile | 318/469 |
| 5,892,340 | A | * | 4/1999 | Sasajima et al. | 318/293 |
| 6,034,494 | A | * | 3/2000 | Kitamine et al. | 318/254 |
| 6,064,165 | A | * | 5/2000 | Boisvert et al. | 318/465 |
| 6,405,485 | B1 | * | 6/2002 | Itami et al. | 49/280 |

FOREIGN PATENT DOCUMENTS

JP      11-236783     8/1999

* cited by examiner

Primary Examiner—Bentsu Ro
(74) Attorney, Agent, or Firm—Brenda O. Holmes; Kilpatrick Stockton LLP

(57) ABSTRACT

A controller PWM control an opening and closing motor (16) of an opening and closing means, increases a duty ratio of the PWM control according to a given increasing rate just after starting the opening and closing motor (16), reducing the duty ratio to a given value by detecting a start of the open close body, and keeping the given value of the duty ratio for a given period.

7 Claims, 8 Drawing Sheets

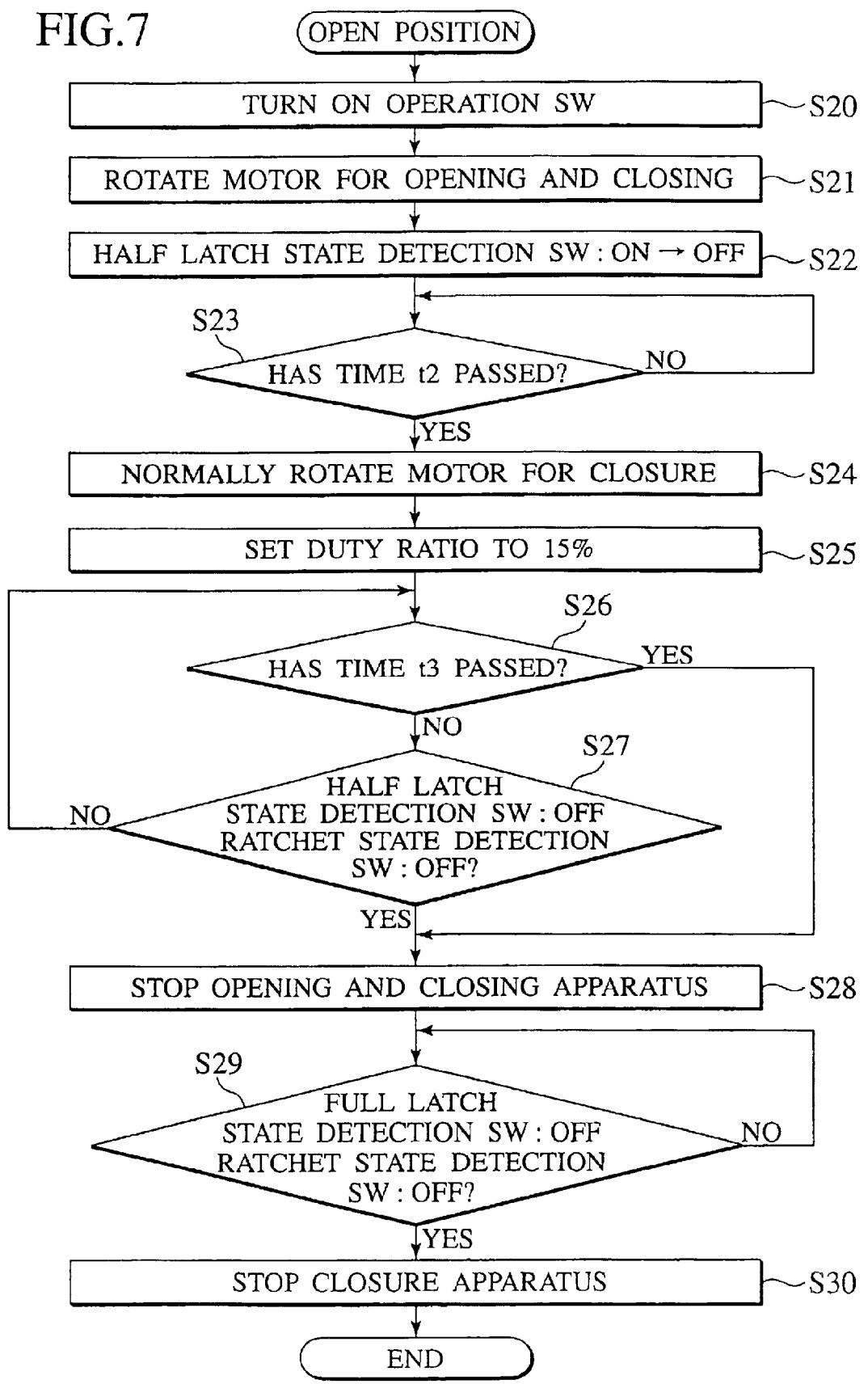

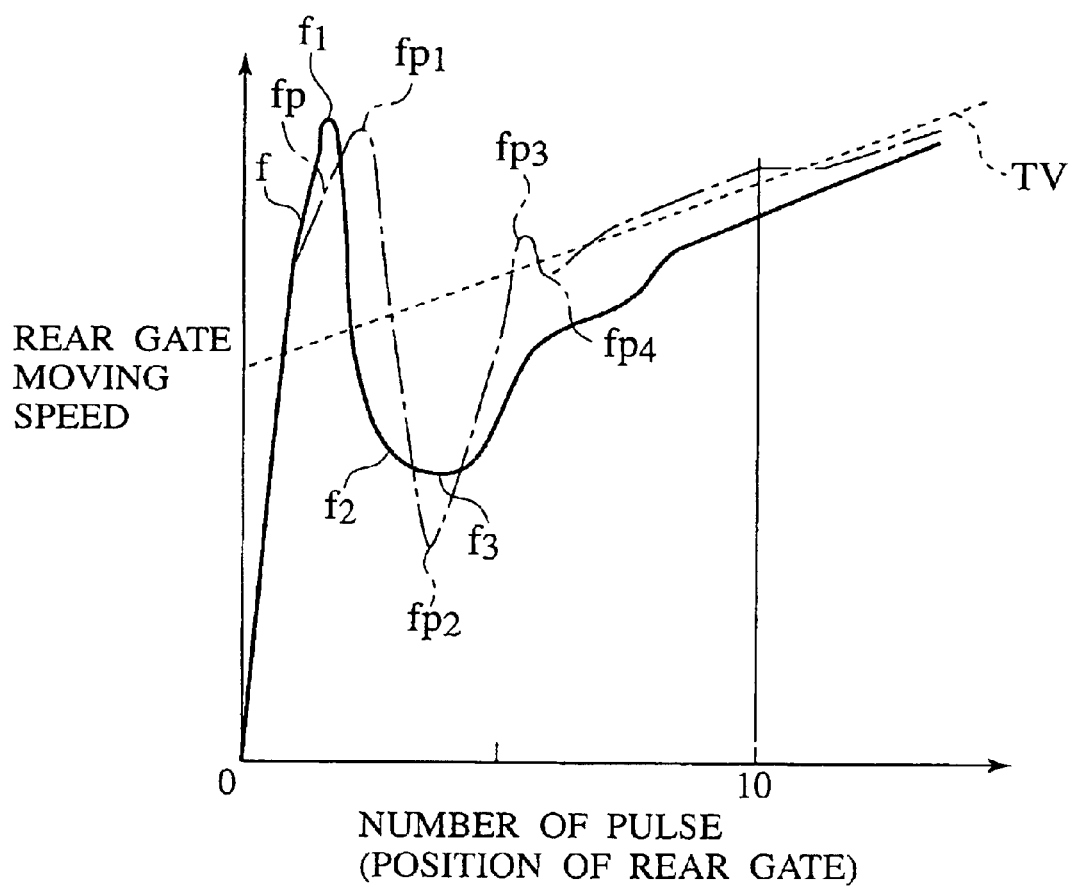

ROTATION SPEED CONTROL APPARATUS OF OPEN CLOSE BODY FOR VEHICLE AND ROTATION SPEED CONTROL METHOD OF THE SAME

CROSS REFERENCE TO RELATED APPLICATIONS

This application claims benefit of priority under 35 U.S.C. 119 to Japanese Patent Applications No. P2002-295782, filed on Oct. 9, 2002, the entire contents of which are incorporated by reference herein.

BACKGROUND OF THE INVENTION

1. Field of the Invention

The present invention relates to a rotation speed control apparatus of an open close body for a vehicle and a control method of the same, and more particularly to a speed control apparatus of an open close body for a vehicle for controlling a rotation speed of the open close body just after the open close body starts moving, in the case of moving so as to open and close the open close body rotatably mounted to a vehicle body, by an opening and closing means.

2. Description of the Related Art

In a conventional speed control apparatus of an open close body for a vehicle, an opening and closing motor of an opening and closing means is controlled by pulse width modulation(PWM) control, and a duty ratio of the PWM (or a duty ratio applied to the motor) is also controlled so that the rotation speed of the open close body and a target value are matched(refer to Japanese Patent Application Laid-Open No. 11-236783).

When rotating the open close body in a state in which the vehicle is brought to a stop on an inclined plane, a rotation speed of the open close body is higher than a rotation speed of the open close body in the case that the vehicle is brought to a stop on a horizontal surface. In this case, in the conventional speed control apparatus of the open close body for the vehicle, the speed just after the open close body starts moving is rapidly increased, and the control of the duty ratio is delayed. Accordingly, there is a problem that the rotation speed of the open close body is rapidly lowered or increased, and the open close body can not be smoothly opened and closed.

SUMMARY OF THE INVENTION

The present invention is made by taking the problem mentioned above into consideration, and an object of the present invention is to provide a speed control apparatus of an open close body for a vehicle for smoothly opening and closing the open close body, just after driving an opening and closing motor.

In order to achieve the object mentioned above, according to the present invention, there is provided a rotation speed control apparatus of an open close body (OCB) for a vehicle rotatably attached to a vehicle body. The rotation control apparatus is comprised of an opening and closing means having a motor for opening and closing the open close body, a detector for detecting a position of the open close body, and a controller for PWM controlling the opening and closing motor of the opening and closing means. The controller increases a duty ratio of the PWM control (a duty ratio applied to the motor) according to a given increasing rate just after starting the opening and closing motor, and reduces the duty ratio to a given value by detecting a start of the open close body by means of the detector, and keeps the given value of the duty ratio for a given period.

BRIEF DESCRIPTION OF THE DRAWINGS

FIG. 7 is a flow chart explaining the closing motion of the open close body; and FIG. 8 is a graph showing a rotation speed of the rear gate.

DETAILED DESCRIPTION OF THE PREFERRED EMBODIMENT

Figure 1:
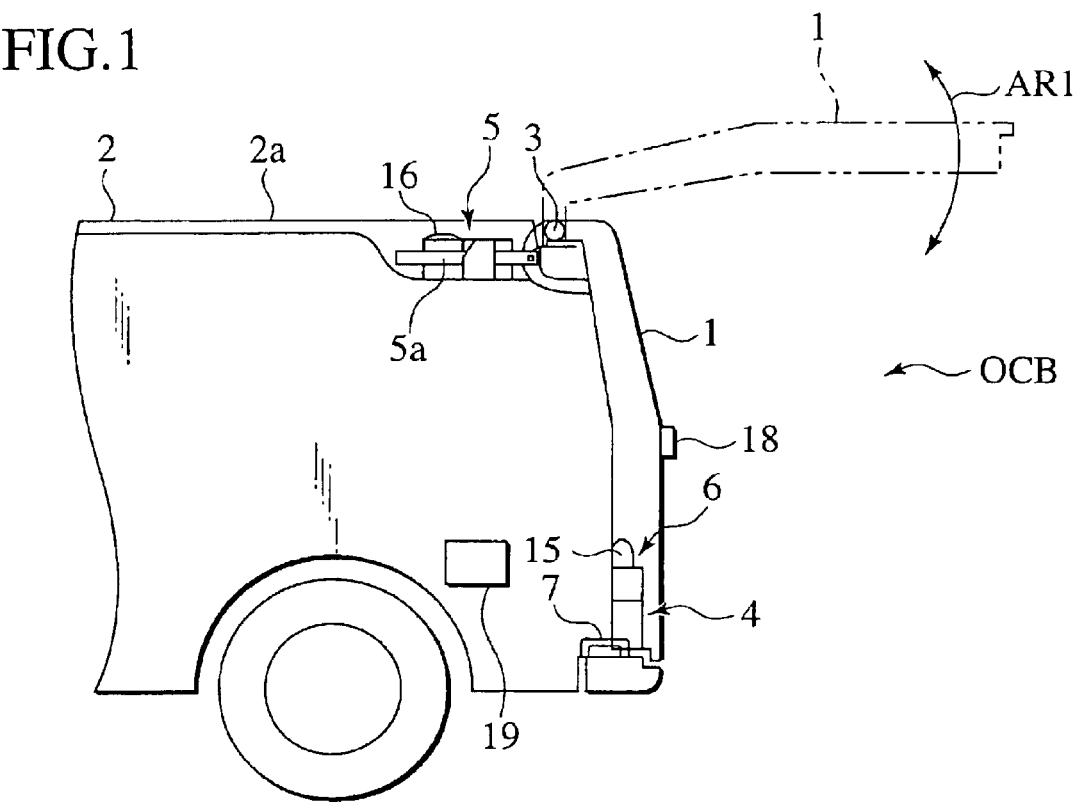
FIG. 1 is a schematic side elevational view of a rear portion of a vehicle, and shows an embodiment according to the present invention.

With reference to FIG. 1, an open close body (OCB) is comprised of a rear gate 1 which is pivoted to an upper portion of a rear end of a vehicle body 2 by a hinge 3 so as to be freely opened and closed in a direction of an arrow AR1 in FIG. 1. A latch apparatus 4 is provided in a center lower portion of the rear gate 1, and is engaged with and disengaged from a striker 7 firmly fixed to the vehicle body 2. A closure apparatus 6 is provided in a lower portion of the rear gate 1, and is connected to the latch apparatus 4.

The rear gate 1 is automatically moved from a door open state (a full-open position) shown by an imaginary line in FIG. 1 to a door ajar state (not shown) by an opening and closing apparatus 5. Here, the door ajar state is positioned just before a door close state (a full-close position) shown by a solid line in FIG. 1.

In the door close state, a latch 8 (mentioned below) of the latch apparatus 4 is completely engaged with the striker 7 (a full-latch state). In the door ajar state, the latch 8 of the latch apparatus 4 is incompletely engaged with the striker 7 (a half-latch state). Further, the rear gate 1 is automatically moved from the door ajar state (the half-latch state) to the full-close position (the full-latch state) by the closure apparatus 6.

Figure 2A:
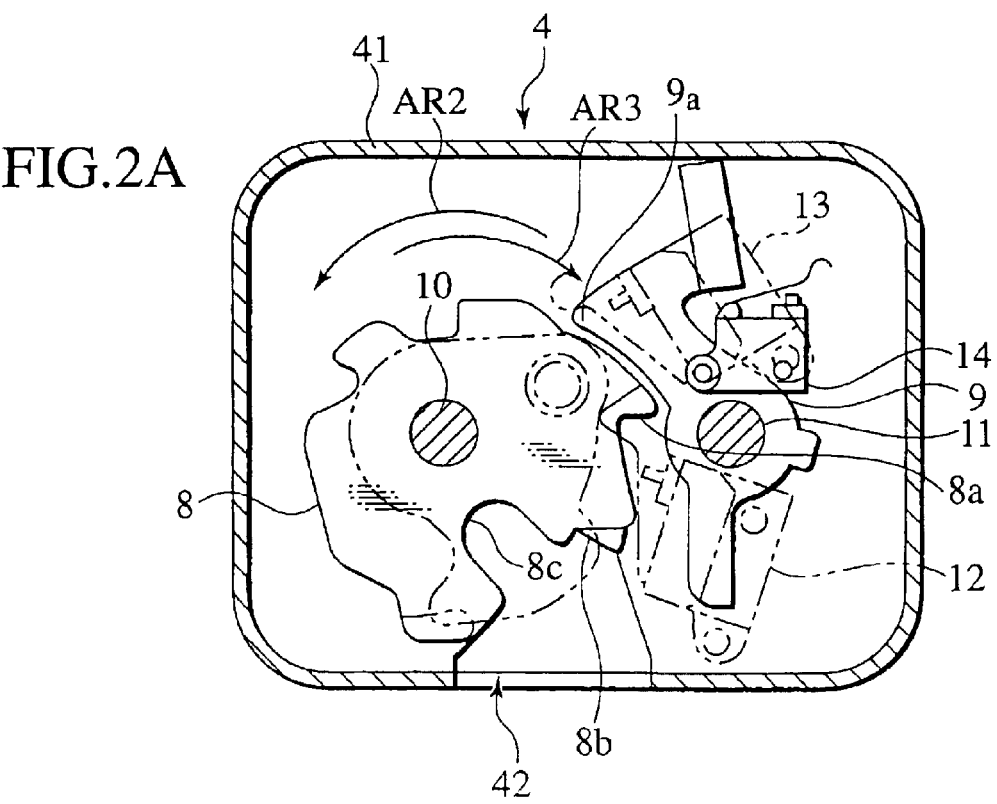
FIG. 2A is an enlarged plan view of a latch apparatus in the case that a rear gate is in an opened state.
Figure 2B:
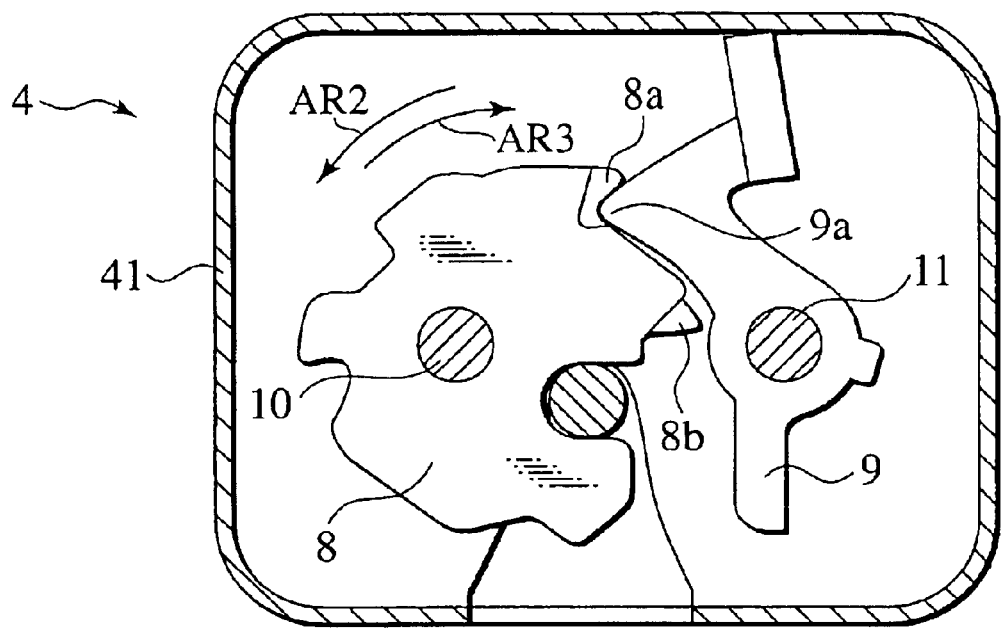
FIG. 2B is an enlarged plan view of the latch apparatus in the case that the rear gate is in a door ajar state (a half-latch state)
Figure 2C:
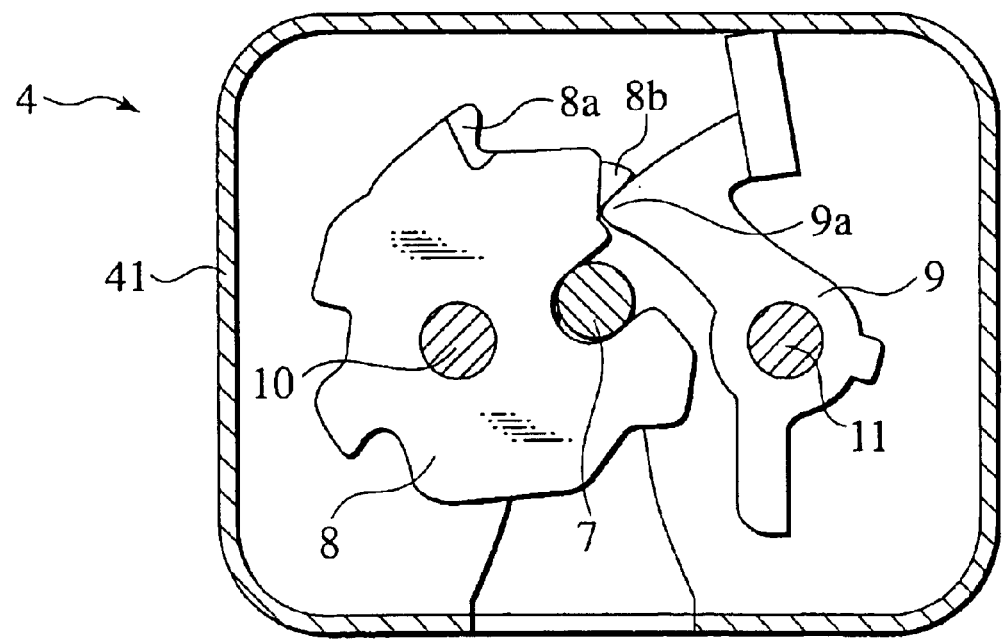
FIG. 2C is an enlarged plan view of the latch apparatus in the case that the rear gate is in a door close state (a full-latch state)

As shown in FIGS. 2A to 2C, the latch 8 is provided within a housing 41 of the latch apparatus 4. The latch 8 has an engagement groove 8c which is engaged with and disengaged from the striker 7 guided from a striker guiding groove 42 into the housing 41. A half latch engagement portion 8a and a full latch engagement portion 8b are provided in an outer periphery of the latch 8, and are pivoted to the housing 41 by a shaft 10. Further, a ratchet 9 is engaged with the half latch engagement portion 8a or the full latch pawl portion 8b by a pawl portion 9a, and is pivoted to the housing 41 by a shaft 11. In addition, the engagement portions 8a and 8b of the latch 8 are made of metal, and the other portions are made of resin.

FIG. 2A shows a state in which the rear gate is opened, that is, a state in which the latch 8 and the striker 7 are not engaged each other. When the rear gate 1 is rotated in a closing direction (a direction of an arrow AR2) from this state, the state is changed to the door ajar state (the half-latch state) in which the striker 7 and the latch 8 are incompletely engaged (FIG. 2B).

When the rear gate 1 is further rotated to the full-latch state(the door close state) from the half-latch state (the door ajar state), the latch 8 is further rotated in the direction of the arrow AR2, and the state is changed to the full-latch state in which the striker 7 and the latch 8 are completely engaged each other, whereby the rear gate 1 is in the full-latch state(the door close state) (FIG. 2C).

As shown in the FIG. 2B, when the latch 8 is in the half-latch state, the pawl portion 9a of the ratchet 9 is engaged with the half latch engagement portion 8a of the latch 8. Accordingly, the latch 8 is inhibited from rotating in a direction of an arrow AR3 in FIG. 2A from the half-latch state. Further, when the latch 8 is in the full-latch state, the pawl portion 9a of the ratchet 9 is engaged with the full latch engagement portion 8b of the latch 8, and the latch 8 is inhibited from rotating in the direction of the arrow AR3 in FIG. 2A from the full-latch state.

The latch apparatus 4 is provided with a half-latch state detection switch (a first detector) 12 for detecting the half-latch state, a full-latch state detection switch(a second detector)13 for detecting the full-latch state, and a ratchet state detection switch(a third detector)14.

The half-latch state detection switch 12, for example, outputs an OFF signal in the case that the latch 8 is in the half-latch state, and outputs an ON signal in the case that the latch 8 is in the other states.

The full-latch state detection switch 13, for example, outputs an OFF signal in the case that the latch 8 is in the full-latch state, and outputs an ON signal in the case that the latch 8 is in the other states.

The ratchet state detection switch 14 detects a ratchet releasing state in which the pawl portion 9a of the ratchet 9 is disengaged from the half latch engagement portion 8a or the full latch engagement portion 8b of the latch 8. The ratchet state detection switch 14, for example, outputs an OFF signal in the state in which the ratchet 9 and the half latch engagement portion 8a (the full latch engagement portion 8b) are engaged, and outputs an ON signal in the state in which the ratchet 9 and the half latch engagement portion 8a (the full latch engagement portion 8b) are disengaged.

The closure apparatus 6 has a closure motor 15, is connected to the latch 8 of the latch apparatus 4 via a speed reduction mechanism connected to the closure motor 15, various links (not shown) and the like, and has a closure function of rotating the latch 8 from the half-latch state to the full-latch state in the case that the rear gate 1 is in the door ajar state, and a release function of releasing the engagement between the ratchet 9 and the latch 8 in the case that the rear gate 1 is in the door close state.

In more detail, the closure function means a function that the closure motor 15 forward rotates at a time when the latch 8 is in the half-latch state, in a process that the rear gate 1 is closed from the door open state, thereby changing the latch 8 from the half-latch state to the full-latch state.

Further, the release function means a function that the closure motor 15 reverse rotates at a time when a door-open signal is input from an operation switch 18 in the case that the rear gate 1 is in the door close state, thereby releasing the engagement between the ratchet 9 and the latch 8.

The opening and closing apparatus 5 comprises an opening and closing motor 16, a speed reduction mechanism 5a reducing a speed of rotation of the opening and closing motor 16 and connected to a portion near the hinge 3 in the rear gate 1, and an electromagnetic clutch 17 (an illustration is omitted in FIG. 1) provided within the speed reduction mechanism 5a and interrupting a power transmission path for connecting the opening and closing motor 16 and the rear gate 1.

The opening and closing apparatus 5 applies a voltage to the electromagnetic clutch 17 so as to set the electromagnetic clutch 17 in a connected state, and sets in a state of capable of transmitting a rotation force of the opening and closing motor 16 to the rear gate 1, in the case that the operation switch 18 provided in the rear gate 1, near a driver's seat or in a key (not shown) is operated.

The closure motor 15, the opening and closing motor 16 and the electromagnetic clutch 17 are controlled by a controller 19 mounted to the vehicle body 2 (described below).

Figure 3:
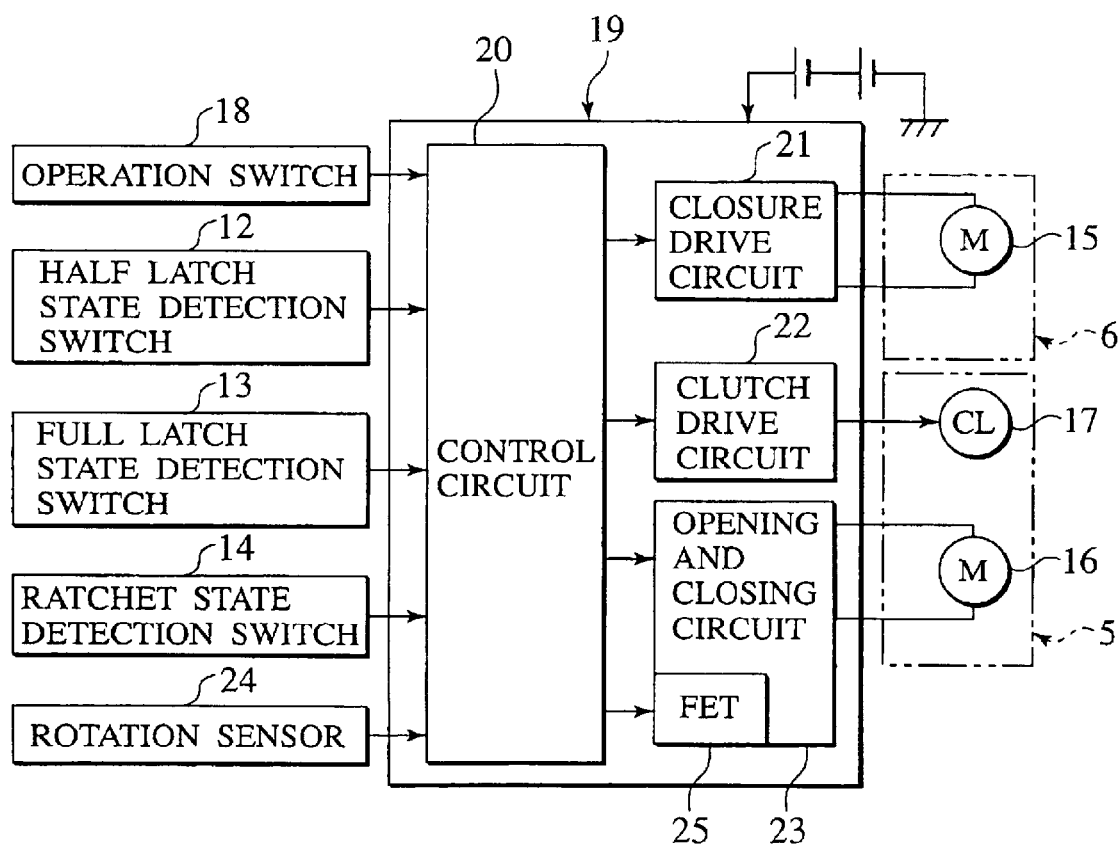
FIG. 3 is a block diagram of a control apparatus.

As shown in FIG. 3, the controller 19 is constituted by an electronic control unit (ECU) having a control circuit 20 having a programmable microcomputer(not shown), a closure drive circuit 21, a clutch drive circuit 22 and an opening and closing drive circuit 23. By PWM controlling, the controller 19 controls the opening and closing motor 16 of the opening and closing apparatus 5 by feeding a given voltage to a field effect transistor (FET) of the opening and closing drive circuit 23, thereby controlling an opening and closing speed of the rear gate 1.

The control circuit 20 of the controller 19 controls the closure motor 15 of the closure apparatus 6 to rotate forward on the basis of a half-latch state signal, moves the latch 8 from the half-latch state to the full-latch state, and moves the rear gate 1 from the door ajar state to the door close state. Here, the half-latch signal is a detected signal by the half-latch state detection switch 12, and means a state of the door has changed from the door open/close state(ON-signal) to the door close/open state(OFF-signal).

The control circuit 20 of the controller 19 changes the opening and closing drive circuit 23 from an OFF state to an ON state, supplies a gate voltage to the FET 25 on the basis of a duty ratio of the PWM control, and switches the FET 25 on the basis of a PWM signal. Accordingly, a drive voltage is fed to the opening and closing motor 16, and the opening and closing motor 16 is PWM controlled.

The control circuit 20 changes each of the clutch drive circuit 22 and the closure drive circuit 21 from an OFF state to an ON state at a given timing. Accordingly, the state of the electromagnetic clutch 17 is set to the connected state, or the closure motor 15 is driven.

A rotation sensor 24 comprising a rotary encoder provided in the opening and closing apparatus 5, and feeds two pulse signals to the control circuit 20 in correspondence to a rotation body (not shown) such as a gear or the like connected to an output side of the electromagnetic clutch 17. Here, differences in a phase of the two pulse signals is substantially 90 degrees.

The control circuit 20 discriminates a rotation direction of the opening and closing motor 16 (a rotation direction of the rear gate 1) on the basis of the phase differences of the pulse signals fed from the rotation sensor 24, detects the rotation speed of the rear gate 1 on the basis of a cycle of the pulse signals, and can determine a moving amount of the rear gate 1 by counting the number of the pulse signals.

When the control circuit 20 receives the door-open signal transmitted from the operation switch 18 in the case that the rear gate 1 is in the door close state, the control circuit 20 sends a release signal to the closure drive circuit 21. When the closure drive circuit 21 receives the release signal, the closure drive circuit 21 drives the closure motor 15 in a reverse rotating direction. Accordingly, the engagement between the latch 8 and the ratchet 9 is released, and the rear gate 1 at the door close state becomes in a state in which the rear gate 1 can move in an opening direction.

Further, when the control circuit 20 receives the door-close signal transmitted from the operation switch 18 in the case that the rear gate is in the open state, the control circuit 20 sends a clutch-engage command signal to the clutch drive circuit 22 and a closing drive command signal to the opening and closing drive circuit 23, respectively. When the clutch drive circuit 22 receives the clutch-engage command signal, the clutch drive circuit 22 sets the electromagnetic clutch 17 in a connected state. Further, when the opening and closing drive circuit 23 receives the closing drive command signal, the opening and closing drive circuit 23 forward rotates the opening and closing motor 16 and closes the rear gate 1.

Further, when the rear gate 1 is rotated from the door close state to the opening direction and a signal indicating that the engagement between the latch 8 and the striker 7 is released is input to the control circuit 20, the opening and closing drive circuit 23 receives an opening drive command signal, reverse rotates the opening and closing motor 16, and opens the rear gate 1.

The circuit including the opening and closing motor 16 and the opening and closing drive circuit 23 constitutes a closed circuit so as to form a brake circuit in the case that the opening and closing drive circuit 23 is in the OFF state. In this case, the opening and closing drive circuit 23 is constituted by a switching element such as a semiconductor or the like, or a relay with contact point such as an electromagnetic relay or the like.

Next, a description will be given of a control at a time of opening the rear gate 1, with reference to FIGS. 4, 6 and 8.

Figure 6:
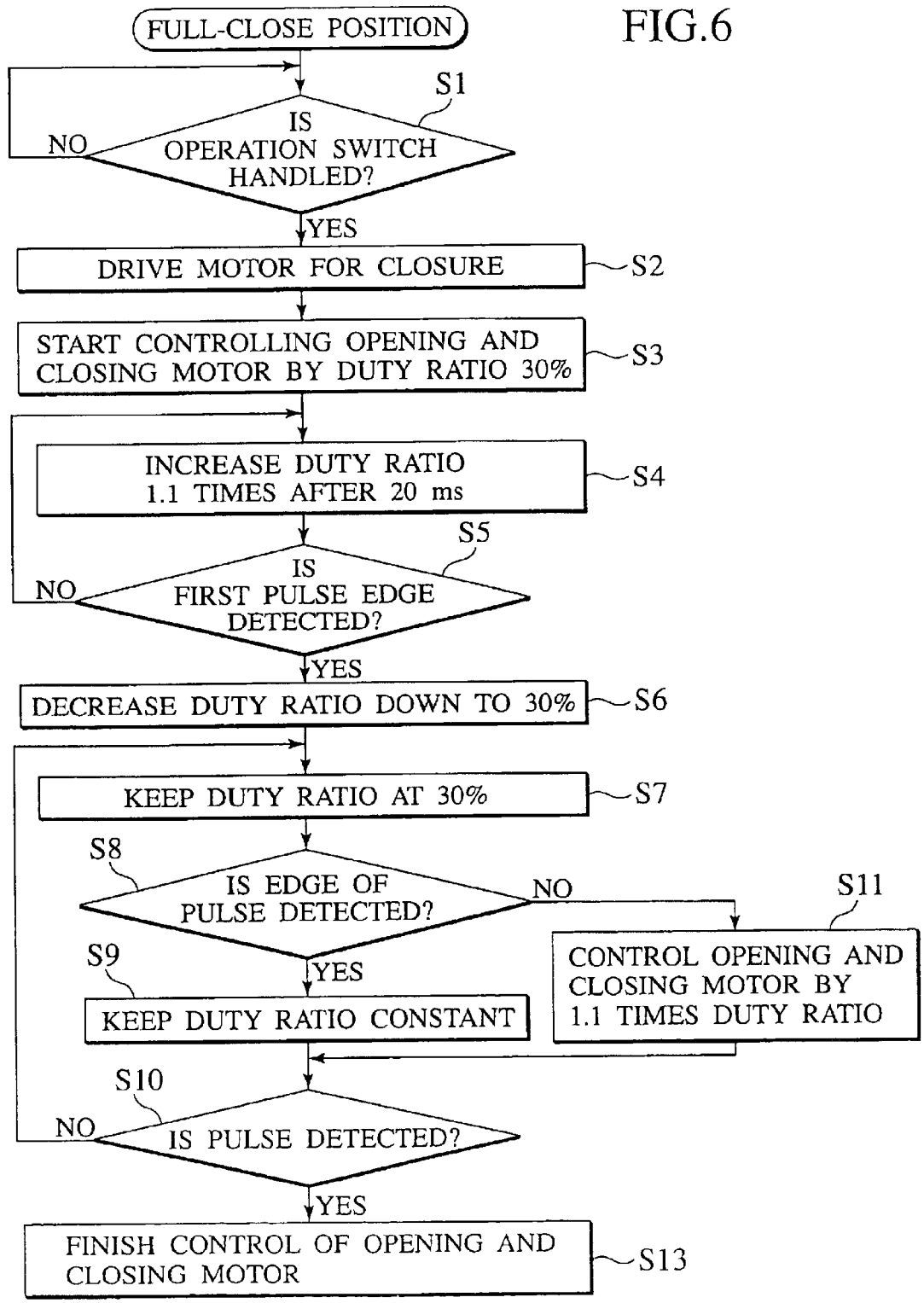
FIG. 6 is a flow chart explaining the opening motion of the open close body.

In FIG. 6, when an opening operation (for example, pushing a given button) is executed by the operation switch 18 in the case that the rear gate 1 is in the door close state (the full-closed position) (step 1), the door-open signal is fed to the control circuit 20.

When the door-open signal is input to the control circuit 20, the control circuit 20 feeds the release signal to the closure drive circuit 21, and drives the closure motor 15 in the reverse rotation direction (step 2). When the closure motor 15 is driven, the engagement between the pawl portion 9a of the ratchet 9 and the full-latch engagement portion 8b of the latch 8 is released, and the latch release signal is detected.

Figure 4:
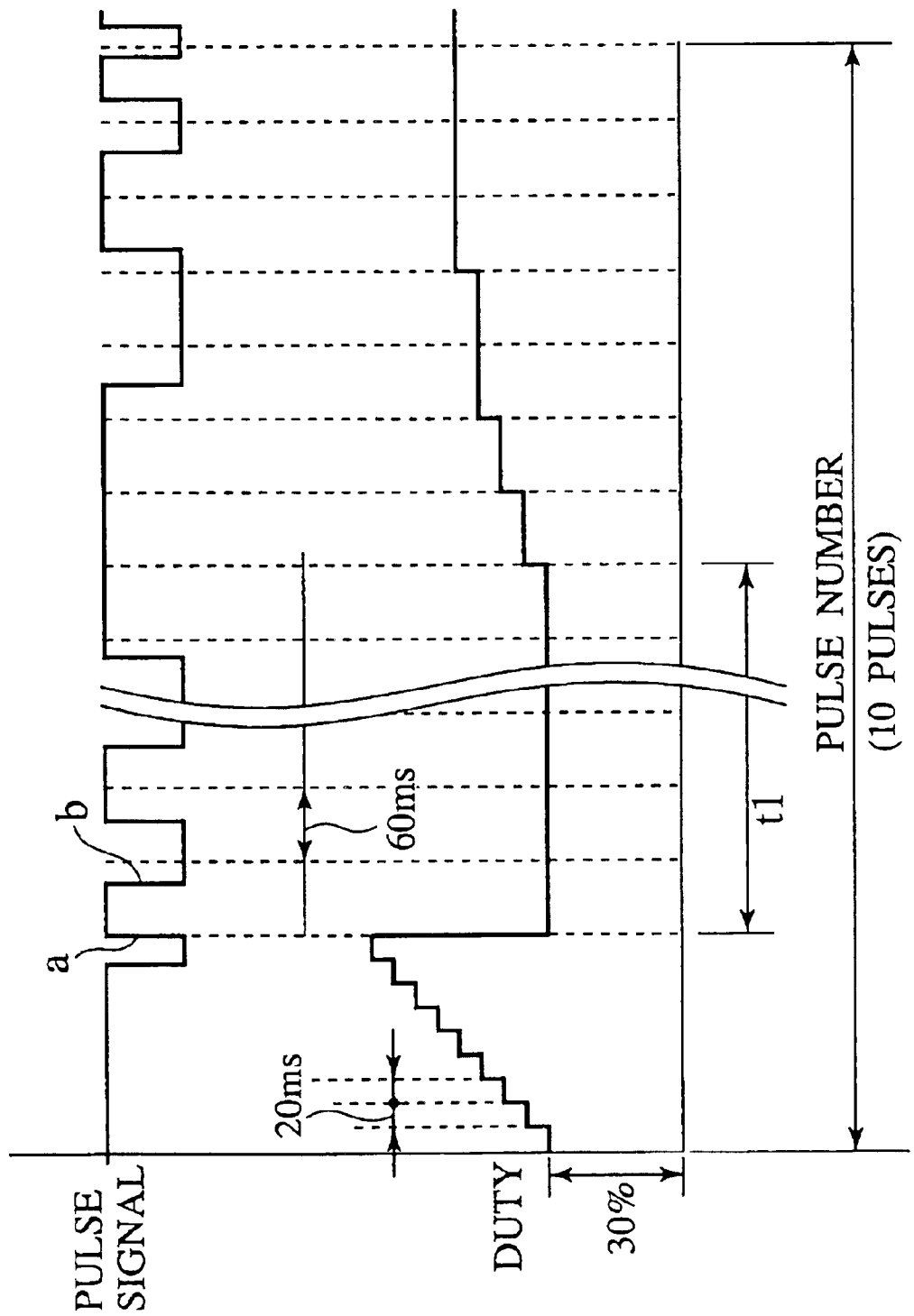
FIG. 4 is a time chart explaining an opening motion of an open close body.

When the latch release signal is input to the control circuit 20, by the PWM control, the control circuit 20 feeds a given duty ratio as an initial value to the FET 25 of the opening and closing drive circuit 23 (step 3), as shown in FIG. 4. In this case, in the present embodiment, the duty ratio is set to 30%.

Next, the duty ratio fed to the FET 25 is increased by 1.1 times every 20 ms, thereby the voltage applied to the opening and closing motor 16 is gradually increased (step 4) (refer to FIG. 4). When the voltage reaches a given initial value, the rear gate starts moving.

At this time, the rotation speed just after the rear gate 1 starts moving is rapidly increased as shown in FIG. 8.

In this case, a solid line f in FIG. 8 shows a rotation speed of the rear gate 1 in the present embodiment, a single-dot chain line fp shows a rotation speed in the case that the PWM control is executed in the prior art, and a broken line TV shows a target rotation speed.

The control circuit 20 detects a rising edge (a) of a first pulse signal output from the rotation sensor 24 (step 5), as shown in FIG. 4. Here, the rising edge (a) of the pulse signal is detected, it mean that the rear gate 1 starts moving in an opening direction. Further, the rising edge (a) is not detected, it mean that the rear gate 1 has not yet start moving. A timing for detecting the rising edge (a) of the pulse signal depends upon a road condition of a place where a vehicle has stop, a weather condition or the like.

When the control circuit 20 detects the rising edge (a) of the first pulse signal, the control circuit 20 rapidly reduces the duty ratio to a given initial value (step 6). In the step 6 of the present embodiment, the rotation speed of the rear gate 1 is rapidly reduced for a point f1 of the line f is shorter time than a point fp1 of the line fp of the prior art, as shown in FIG. 8. In addition, in this embodiment, as mentioned above, the given initial value of the duty ratio is 30%.

This is because the prior art controls the rotation speed toward the target value while feeding back the rotation speed of the rear gate 1 at real time, however, the embodiment according to the present invention executes the control of immediately reducing the rotation speed without relation to the rotation speed of the rear gate 1 just after the rear gate 1 starts moving.

The control circuit 20 maintains the duty ratio in 30% for a time t1 (step 7). In this case, since the duty ratio is kept constant without relation to the rotation speed of the rear gate 1, in the step 7, the speed reduction of the rotation speed of the rear gate 1 is reduced in comparison with the prior art (refer to a line f2 in FIG. 8).

In the case that the rising edge (a) of the pulse signal is not detected in the step 5, the control of making the duty ratio 1.1 times every 20 ms is repeated until the rising edge a is detected (step 4).

The control circuit 20 monitors every 60 ms during the period that the duty ratio is kept 30% whether a falling edge (b) of the pulse signal exists (step 8). When the control circuit 20 detects the edges (b), a step 9 is executed, and in the case that the control circuit 20 does not detect the edges (b), a step 11 is executed.

In the case that the rotation speed of the rear gate 1 toward the opening direction is not below the target speed TV in the step 8, the falling edge (b) is detected. On the contrary, in the case that the rotation speed of the rear gate 1 toward the opening direction is below the target speed TV, the falling edge (b) is not detected.

In the step 9, the rear gate 1 is controlled by the control circuit 20 so that its opening speed reach/is lower than a given rotation speed. In addition, in this step, the controller keeps the duty ratio in 30%.

In the step 11, at a timing when the rotation speed of the rear gate 1 toward the opening direction is reduced to the given rotation speed, and the falling edge (b) is not detected, the duty ratio is increased at a given increasing rate every 60 ms. In this embodiment, the duty ratio is increased by 1.1 times.

According to the step 11, the rotation speed of the rear gate 1 is slowly increased.

In the prior art, since the duty ratio is rapidly increased when the reduction of the rotation speed of the rear gate 1 is detected. The rotation speed of the rear gate 1 is rapidly increased as shown by a point fp2 to a point fp3 in FIG. 8, and becomes at least the target rotation speed TV.

Further, according to the conventional control method, after the rotation speed of the rear gate become at least the target rotation speed TV, a control of reducing the excess rotation speed of the rear gate 1 is executed. As a result, the opening and closing motion of the rear gate is not smoothly performed at a minimum value fp4.

On the contrary, according to the present embodiment, since the rotation speed of the rear gate 1 is slowly increased after being slowly reduced, it is possible to smoothly move the rear gate 1.

In a step 10, the control circuit 20 judges whether or not ten pulses of the pulse signal are output from the rotation sensor 24. In the case that the control circuit 20 detects ten pulses, a step 13 is executed, and the control of the opening and closing motor 16 is finished. In this case, in the present embodiment, an amount of rotation for moving the rear gate 1 at seven times corresponds to ten pulses.

The control circuit 20 controls the duty ratio of the PWM control while feedback controlling the rotation speed of the rear gate 1 after the drive control just after starting the opening and closing motor 16 is finished, and moves the rear gate 1 to the door open state while controlling to the target rotation speed TV. When the rear gate 1 becomes the door open state, and the control circuit 20 counters the pulse number corresponding to the door open state, the control circuit 20 stops the opening and closing motor 16.

Next, a description will be given of a close control with reference to a time chart shown in FIG. 5 and a flow chart shown in FIG. 7.

When the rear gate 1 is in the open state, the door-close signal is input to the control circuit 20 of the controller 19 from the operation switch 18 (step 20).

The control circuit 20 feeds the closing drive command signal to the opening and closing drive circuit 23 (step 21). When the opening and closing circuit 23 receives the closing drive command signal, the opening and closing drive circuit 23 is changed from the OFF state to the ON state, and rotates the opening and closing motor 16 in the direction in which the rear gate 1 is closed. The rear gate 1 is moved in the closing direction while being controlled to the target rotation speed, according to the PWM control of the opening and closing motor 16.

When the rear gate 1 becomes the door ajar state, and the engagement state between the latch 8 and the pawl portion 9a of the ratchet 9 becomes in the half-latch state, the half-latch state detection switch 12 is changed from the ON state to the OFF state, and outputs the half-latch signal to the control circuit 20 (step 22).

The control circuit 20 clocks a half-latch signal detection time t2 (step 23). In this embodiment, the time t2 is 200 ms. When the half-latch detection time t2 has passed, a step 24 is executed. Further, in the case that the half-latch signal disappears before the half-latch signal detection time t2 has passed, the half-latch signal detection time t2 is again clocked at a timing when the half-latch signal is output, or the driving of the opening and closing motor 16 is stopped.

In this case, the half-latch signal detection time t2 has passed, it mean that the rear gate 1 is in the door ajar state without being returned to the opening direction from the door ajar state by a seal reaction force. Further, in the case that the half-latch signal disappears within the half-latch signal detection time t2, it is judged that the rear gate 1 is rebounded immediately in the opening direction from the door ajar state of the rear door 1 due to some reasons such as a seal reaction force, a clamping force or the like. In this case, the closure apparatus 6 is not driven.

Figure 5:
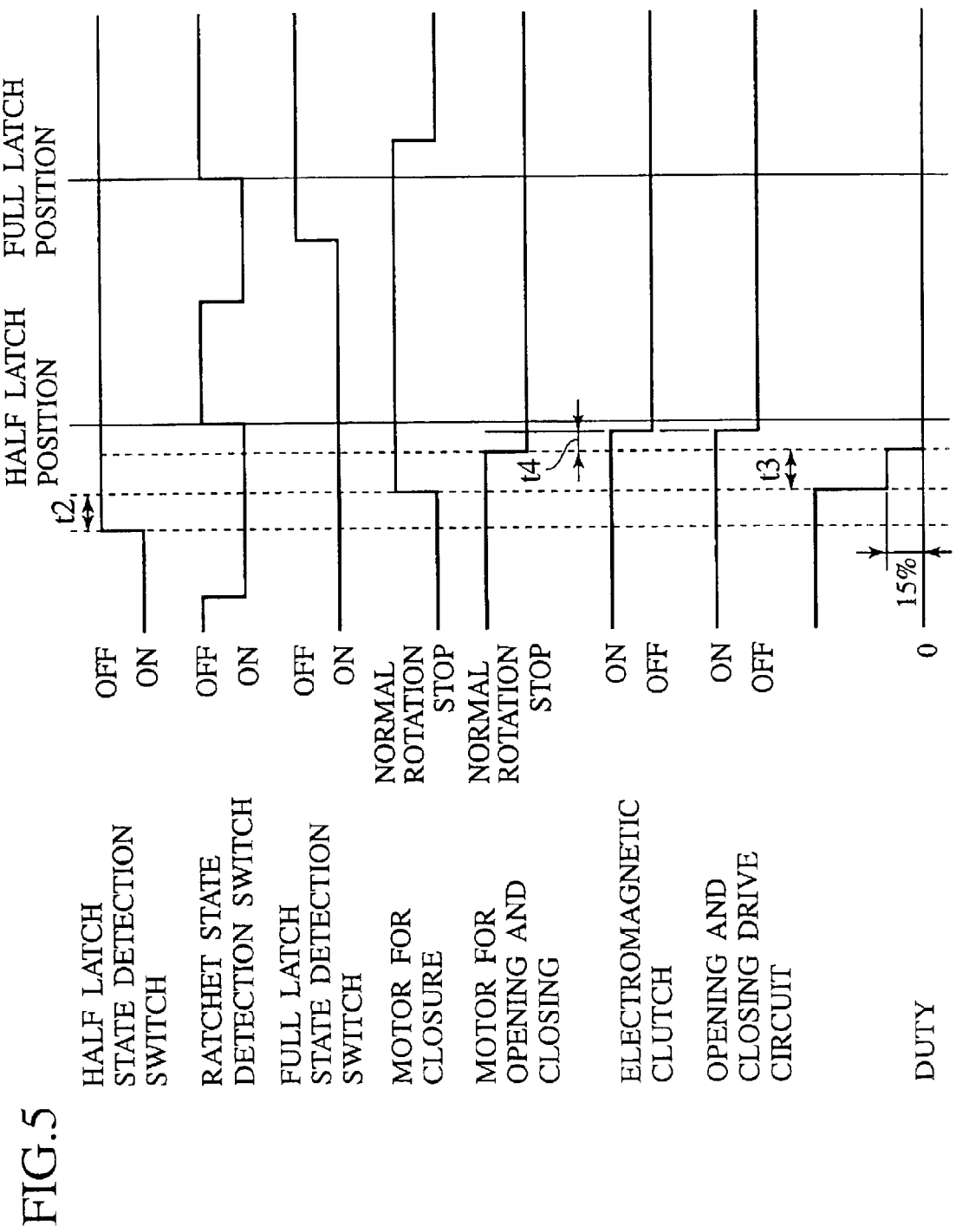
FIG. 5 is a time chart explaining a closing motion of the open close body.

The control circuit 20 feeds the drive command signal to the closure drive circuit 21 after the half-latch signal detection time t2 has passed, as shown in FIG. 5, and controls so as to forward rotate the closure motor 15 (step 24). The control circuit 20 reduces the duty ratio of the PWM control input to the FET 25 down to 15% (step 25).

In this case, 15% of the duty ratio corresponds to such a weak force that the rear gate 1 is not returned in the opening direction even by the seal reaction force applied to the rear gate 1 under the door ajar state, that is, a force for moving the rear gate 1 in the opening direction. Accordingly, the latch 8 is prevented from being returned in the opening direction from the state in which the latch 8 is engaged with the striker 7.

Further, in the case that the rear gate 1 is moved in the opening direction from the door ajar state in spite that the rear gate 1 becomes in the door ajar state, and the striker 7 and the latch 8 are once engaged, the closure motor 15 is not driven, so that it is possible to prevent the closure apparatus 15 from being improperly operated.

The control circuit 20 judges whether or not a time t3 has been passed after the closure motor 15 is driven (step 26). In this embodiment, the time 3 is 350 ms. In the case that the time t3 has passed, a step 28 is executed, and in the case that the time t3 has not passed, a step 27 is executed.

In this case, the time t3 corresponds to a time required until the closure apparatus 6 is ready for rotating the latch 8 of the latch apparatus 4 after the closure motor 15 is started, and the latch 8 is inhibited from rotating in the opening direction. In other words, this time corresponds to a time by which the closure apparatus 6 moves at an allowance existing in the drive force transmitting path connecting the link and the latch 8.

In the case of transition from the step 26 to the step 28, the control circuit 20 sets the duty ratio of the PWM control fed to the FET 25 to 0% while feeding the closing drive command signal to the opening and closing drive circuit 23, in the state in which the electromagnetic clutch 17 is kept in the ON state (the connected state), after the time t3 has passed, as shown in FIG. 5.

Accordingly, although the opening and closing motor 16 is stopped, the opening and closing drive circuit 23 is in the ON state. Therefore, no brake circuit is formed on the circuit including the opening and closing motor 16.

Further, the ON state of the clutch drive circuit 22 and the opening and closing drive circuit 23 is continuously kept for a time t4 after the time t3 has passed. In addition, in this embodiment, the time t4 is 100 ms.

After the time t4 has passed, a state of the clutch drive circuit 22 and a state of the opening and closing circuit 23 are changed from the ON state to the OFF state, the step goes to a step 28, the opening and closing apparatus 5 is stopped. After the opening and closing apparatus 5 is stopped, a step 29 is executed.

During the period of the time t4, the electromagnetic clutch 17 is in the connected state and the rear gate 1 and the opening and closing motor 16 are in the connected state. Further, there is generated a state in which no brake circuit is formed on the circuit including the opening and closing motor 16.

Accordingly, during the period of the time t4, the rear gate 1 in the state in which the portion near the hinge 3 is distorted due to the pulling force of the opening and closing apparatus 5 can slowly discharge a distortion energy against the force for reverse rotating the opening and closing motor 16 via the speed reduction mechanism, so that no large returning sound is generated.

In the step 27, in the state in which the half-latch state detection switch 12 outputs the half-latch state signal to the control circuit 20, when the ratchet-state detection switch 14 outputs the engagement signal, the step goes to the step 28, and the control circuit 20 stops the opening and closing motor 16.

In other words, since the matter that the ratchet-state detection switch 14 outputs the engagement signal corresponds to a state in which the pawl portion 9a of the ratchet 9 is engaged with the half latch engagement portion 8a, the rear gate 1 does not move in the opening direction even by stopping the opening and closing motor 16.

Accordingly, it is possible to prevent the improper operation that the latch 8 is rotated in the opening direction from the half-latch state so as to be broken away from the striker 7, before the closure apparatus 6 is ready for rotating the latch 8.

In a step 29, after the full-latch state detection switch 13 is changed from the ON state to the OFF state, the pawl portion 9a of the ratchet 9 is engaged with the full-latch engagement portion 8b of the latch 8, the ratchet-state detection switch 14 is again changed from the ON state to the OFF state, and the full-latch signal is output. In the following step 30, the control circuit 20 stops the closure motor 15 after a given time has passed, and thereafter returns the closure apparatus 6 to a neutral state.

In the case that the rear gate 1 has a high rotation speed in the closing direction and moves to the full-close position without temporarily stopping in the door ajar state, the step goes to the step 28 from the step 21, and in a stage that the full-latch signal is output, the control circuit 20 sets the duty ratio of the PWM control fed to the FET 25 to 0% while feeding the closing drive command signal to the opening and closing drive circuit 23, in a state in which the electromagnetic clutch 17 is kept in an on state (a connected state), after the time t3 has passed.

Further, the present invention can be achieved without the electromagnetic clutch 17.

In the case that the electromagnetic clutch 17 is not provided, the rotation force of the opening and closing motor 16 is transmitted to the rear gate 1 via the speed reduction mechanism 5a without passing through the electromagnetic clutch 17.

What is claimed is:

1. A rotation speed control apparatus of an open close body rotatably attached to a vehicle body so as to be freely opened and closed, comprising:

an opening and closing means having a motor for opening and closing the open close body;

a detector for detecting a position of the open close body; and a controller for PWM controlling the motor, increasing a duty ratio of the PWM control according to a given increasing rate just after starting the motor, reducing the duty ratio to a given value by detecting a start of the open close body by means of the detector, and keeping the given value of the duty ratio for a given period.

2. A rotation speed control apparatus of claim 1, wherein the controller gradually increases the duty ratio applied to the motor from a given value according to a given rate, in the case that the controller discriminates that the rotation speed of the open close body reaches at most a given speed.

3. A rotation speed control apparatus of claim 1, wherein the open close body is provided with a latch apparatus to which a striker provided in the vehicle body is guided, and wherein a detector for detecting an engaging state of the latch apparatus is provided within the latch apparatus.

4. A rotation speed control apparatus of claim 3, wherein the latch apparatus comprises a latch rotatably mounted to the latch apparatus; and a ratchet having a pawl portion being engaged with the latch and rotatably mounted to the latch apparatus, and wherein the pawl portion of the ratchet and a half latch engagement portion of the latch are engaged in the case that the open close body is in a door ajar state, and wherein, in the case that the open close body is in a door close state, the striker is engaged with an engagement groove of the latch, and the pawl portion of the ratchet and a full latch engagement portion of the latch are engaged.

5. A rotation speed control apparatus of claim 4, wherein the detector further comprises a first detecting apparatus for detecting the door ajar state, a second detecting apparatus for detecting the door close state, and a third detecting apparatus for detecting the state of the ratchet.

6. A rotation speed control apparatus of claim 1, wherein the detector comprises a rotary encoder.

7. A rotation speed control method of an open close body rotatably attached to a vehicle body so as to be freely opened and closed, comprising the steps of:

increasing a voltage applied to a motor driving the open close body step by step from an initial voltage;

detecting a start of rotation of the open close body;

reducing the voltage applied to the motor to a given value and keeping the electric voltage constant until a rotation speed of a rear gate becomes smaller than a given target rotation speed;

increasing the voltage applied to the motor every given time;

keeping the voltage applied to the motor constant until the open close body reaches a given position; and stopping the motor at a time when the open close body reaches the given position.

* * * * *